US009881210B2

(12) United States Patent
Broadbent et al.

(10) Patent No.: US 9,881,210 B2
(45) Date of Patent: Jan. 30, 2018

(54) GENERATING A COMPUTER EXECUTABLE CHART VISUALIZATION BY ANNOTATING A STATIC IMAGE

(71) Applicant: International Business Machines Corporation, Armonk, NY (US)

(72) Inventors: Peter R. Broadbent, Bristol (GB); Leo A. Coolen, Roermond (NL); Franciscus J. J. van Ham, Geldrop (NL); Graham J. Wills, Naperville, IL (US)

(73) Assignee: International Business Machines Corporation, Armonk, NY (US)

( * ) Notice: Subject to any disclaimer, the term of this patent is extended or adjusted under 35 U.S.C. 154(b) by 185 days.

(21) Appl. No.: 14/840,186

(22) Filed: Aug. 31, 2015

(65) Prior Publication Data

US 2016/0110895 A1   Apr. 21, 2016

(30) Foreign Application Priority Data

Oct. 21, 2014 (GB) .................................. 1418715.7

(51) Int. Cl.
*G06K 9/00* (2006.01)
*G06T 11/20* (2006.01)
*G06K 9/46* (2006.01)

(52) U.S. Cl.
CPC ........ *G06K 9/00476* (2013.01); *G06T 11/206* (2013.01); *G06K 9/4652* (2013.01); *G06T 2200/24* (2013.01)

(58) Field of Classification Search
None
See application file for complete search history.

(56) References Cited

U.S. PATENT DOCUMENTS

| 5,467,411 A | * | 11/1995 | Tanaka | ............... G06K 9/00476 |
| | | | | 382/113 |
| 5,513,271 A | * | 4/1996 | Rao | .................... G06K 9/00449 |
| | | | | 382/113 |
| 5,537,522 A | * | 7/1996 | Shibuta | ................. G06T 11/206 |
| | | | | 345/441 |
| 5,673,337 A | * | 9/1997 | Gallo | ................... G06K 9/4609 |
| | | | | 382/187 |

(Continued)

OTHER PUBLICATIONS

Fekete et al., "Obvious: A meta-toolkit to encapsulate information visualization toolkits—One toolkit to bind them all", 2011 IEEE Conference on Visual Analytics Science and Technology (VAST), Oct. 23-28, 2011, pp. 91-100. DOI: 10.1109/VAST.2011.6102446.

(Continued)

*Primary Examiner* — David H Chu
(74) *Attorney, Agent, or Firm* — Daniel C. Housley

(57) ABSTRACT

A computer executable chart visualization may be generated from a static image of the chart visualization. The static image, a set of pre-defined chart elements, and a portion of the static image that corresponds to a pre-defined chart element may each be identified. A mapping between the portion of the static image and the pre-defined chart elements may be determined, and a visual or logical property of each portion of the static image may be determined. A declarative description of the chart visualization may be generated by setting the visual properties for each of the respective pre-defined chart elements.

20 Claims, 8 Drawing Sheets

(56) References Cited

U.S. PATENT DOCUMENTS

| | | | |
|---|---|---|---|
| 5,761,328 A * | 6/1998 | Solberg | G06K 9/00476 382/113 |
| 6,134,338 A * | 10/2000 | Solberg | G06K 9/00476 382/113 |
| 7,089,261 B2 * | 8/2006 | Hladik, Jr. | G06F 17/246 345/440 |
| 7,386,835 B1 | 6/2008 | Desai et al. | |
| 7,412,094 B2 * | 8/2008 | Chen | G06F 3/03545 382/151 |
| 7,463,263 B2 | 12/2008 | Gilboa | |
| 7,880,749 B2 | 2/2011 | Fevert et al. | |
| 8,196,047 B2 | 6/2012 | Fisher et al. | |
| 8,531,451 B2 | 9/2013 | Mital et al. | |
| 9,378,562 B1 | 6/2016 | Ciolfi et al. | |
| 2003/0131284 A1 | 7/2003 | Flanagan et al. | |
| 2003/0169375 A1 * | 9/2003 | Lin | H04N 19/865 348/625 |
| 2005/0063592 A1 * | 3/2005 | Li | G06K 9/222 382/181 |
| 2006/0062464 A1 * | 3/2006 | Li | G06K 9/222 382/186 |
| 2008/0010597 A1 | 1/2008 | Seemann et al. | |
| 2008/0143735 A1 * | 6/2008 | Besley | G06K 9/6211 345/582 |
| 2008/0244416 A1 | 10/2008 | Dumant et al. | |
| 2009/0322755 A1 * | 12/2009 | Holm-Peterson | G06T 11/20 345/440 |
| 2009/0326921 A1 | 12/2009 | Robertson et al. | |
| 2010/0080462 A1 * | 4/2010 | Miljanic | G06K 9/00429 382/186 |
| 2012/0218254 A1 | 8/2012 | Abeln | |
| 2014/0067836 A1 | 3/2014 | Holmes et al. | |
| 2014/0125672 A1 * | 5/2014 | Winternitz | G06F 8/38 345/440 |
| 2014/0195938 A1 * | 7/2014 | Cath | G06F 3/048 715/765 |
| 2015/0145883 A1 | 5/2015 | Marti | |
| 2015/0268948 A1 | 9/2015 | Plate | |
| 2016/0110167 A1 | 4/2016 | Broadbent et al. | |

OTHER PUBLICATIONS

Jafri et al., "A Survey of Face Recognition Techniques", Journal of Information Processing Systems, vol. 5, No. 2, Jun. 2009, pp. 41-68. Copyright © 2009 KIPS. DOI : 10.3745/JIPS.2009.5.2.041.

Unknown, "Vega: A Visualization Grammar", GitHub, © 2015 GitHub, Inc., pp. 1-2. Last printed Jun. 25, 2015. https://github.com/trifacta/vega.

Unknown, "Protovis: A Graphical Approach to Visualization", Copyright 2010 Stanford Visualization Group, 1 page. Last printed Jun. 26, 2015. http://mbostock.github.io/protovis/.

Unknown, "Rave", Rave, pp. 1-2. Last printed Jun. 26, 2015. http://vottrave.ottawa.ibm.com/.

Weaver, C., "Building Highly-Coordinated Visualizations in Improvise", In Proceedings of the IEEE Symposium on Information Visualization (INFOVIS '04). IEEE Computer Society, Washington, DC, USA, pp. 159-166. DOI: 10.1109/INFOVIS.2004.12. http://dx.doi.org/10.1109/INFOVIS.2004.12.

Wilkinson, L., "The Grammar of Graphics", Springer, 2nd edition (Jul. 15, 2005), Chapter 19, pp. 617-622.

GB Application 1418715.7, entitled "Generating a Computer Executable Chart Visualization by Annotating a Static Image of Said Visualization", filed on Oct. 21, 2014, abandoned Jun. 18, 2015, 27 pages.

Heer et al., "Declarative Language Design for Interactive Visualization", Computer Science Department of Stanford University, Stanford, CA, posted online Oct. 24, 2010, 8 pages.

Unknown, "Declarative Language", Dictionary.com, © 2016 Dictionary.com, LLC., 3 pages. Printed on Oct. 27, 2016. http://www.dictionary.com/browse/declarative-language.

GB Application 1418714.0, entitled "Improving Visualizations Created in Declarative Visualization Languages", filed Oct. 21, 2014, 20 pages.

List of IBM Patents or Patent Applications Treated as Related, dated Oct. 26, 2016, pp. 1-2.

"Violation", Definition of Violation by Merriam-Webster, © 2016 Merriam-Webster, 7 pages, printed Nov. 21, 2016. http://www.merriam-webster.com/dictionary/violation.

* cited by examiner

GENERATING A COMPUTER EXECUTABLE CHART VISUALIZATION BY ANNOTATING A STATIC IMAGE

BACKGROUND

The present disclosure relates to generating a computer executable chart visualization from a static image of said chart, and more particularly to generating a computer executable chart visualization by annotating a static image of said chart. The programming of components that can represent data in a graphical manner (i.e., visualizations) can be complicated because it involves areas ranging from data processing to user interaction to computer graphics. Numerous domain specific, declarative languages for visualization definition exist. Such languages allow users to specify what they want to see as a graphical representation of their data, instead of specifying how that view should be generated. Languages such as The Grammar of Graphics or VEGA allow a user to describe the desired visualization in terms of its output mapping.

SUMMARY

Embodiments of the present disclosure may be directed toward a method for generating a computer executable chart visualization from a static image of the chart visualization. The static image of the chart visualization and a set of pre-defined chart elements may be identified. One or more portions of the static image may be identified as corresponding to one or more respective pre-defined chart elements. A mapping between the one or more portions of the static image and the one or more respective pre-defined chart elements may be determined. Visual properties of each of the one or more portions of the static image may be determined and a declarative description of the chart visualization may be generated by setting the visual properties for each of the one or more respective pre-defined chart elements.

Embodiments of the present disclosure may be directed toward a system for generating a computer executable chart visualization from a static image of the chart visualization. The system may have one or more processor circuits that re configured to identify the static image of the chart visualization and identify a set of pre-defined chart elements. The circuit or circuits may be configured to identify one or more portions of the static image as corresponding to one or more respective pre-defined chart elements, and determine a mapping between the one or more portions of the static image and the one or more respective pre-defined chart elements. The circuit may also be configured to determine the visual properties of each of the one or more portions of the static image, and generate a declarative description of the chart visualization by setting the visual properties for each of the one or more respective pre-defined chart elements.

Embodiments of the present disclosure may be directed toward a computer program product for generating a computer executable chart visualization from a static image of the chart visualization. The computer program product may comprise a computer readable storage medium having computer readable program code embodied therewith. The computer readable program code may be adapted to identify the static image of the chart visualization and a set of pre-defined chart elements. One or more portions of the static image may be identified as corresponding to one or more respective pre-defined chart elements, and a mapping between the one or more portions of the static image and the one or more respective pre-defined chart elements may be determined. Visual properties of each of the one or more portions of the static image may be determined and a declarative description of the chart visualization may be generated by setting the visual properties for each of the one or more respective pre-defined chart elements.

The above summary is not intended to describe each illustrated embodiment or every implementation of the present disclosure.

BRIEF DESCRIPTION OF THE DRAWINGS

Preferred embodiments of the present disclosure will now be described in more detail, by way of example only, with reference to the accompanying drawings, in which.

DETAILED DESCRIPTION

Figure 1:
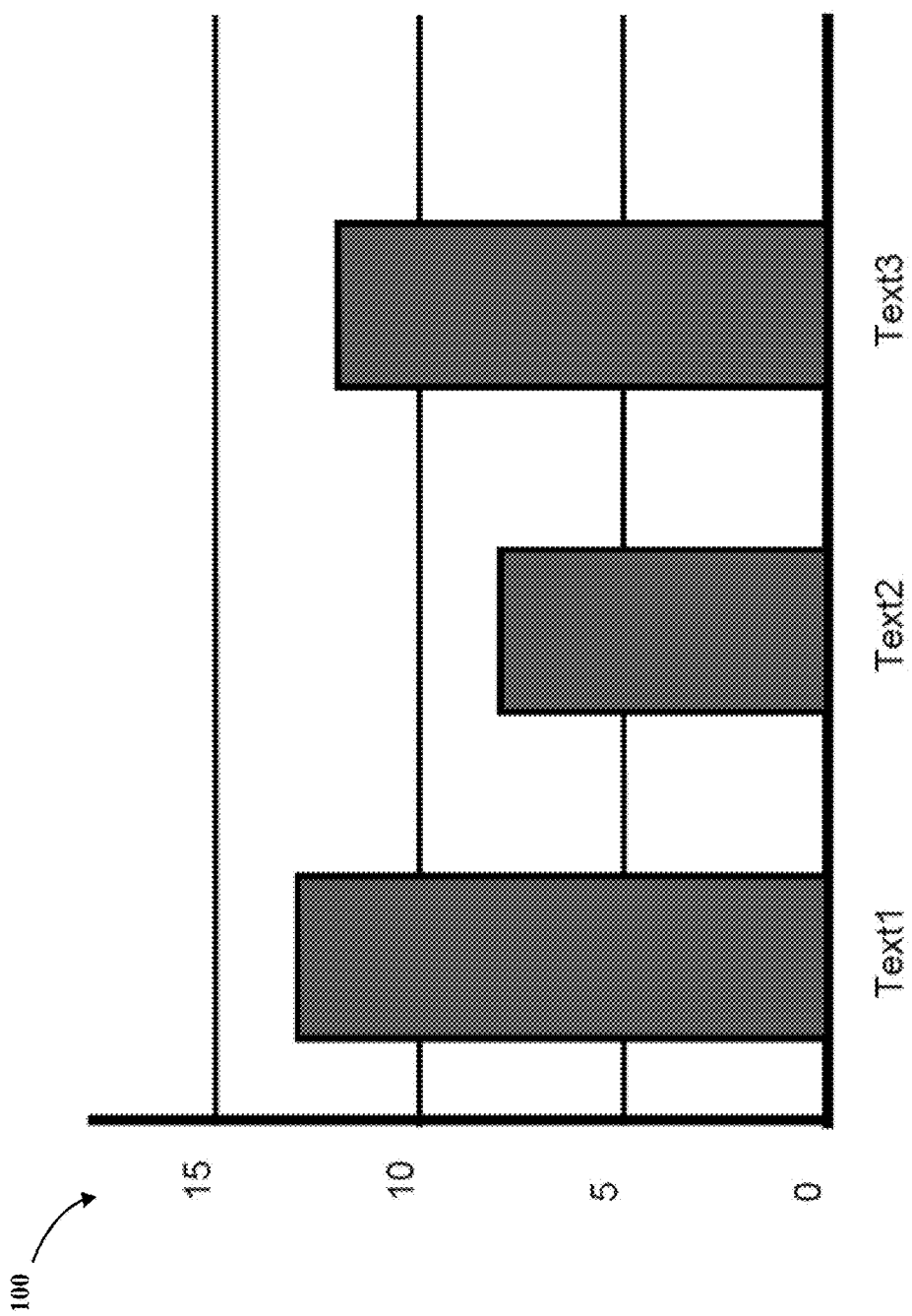
FIG. 1 shows an example chart image that may be used as input to embodiments of the present disclosure.

The programming of components that can represent data in a graphical manner (i.e., visualizations) can be complicated because it involves areas ranging from data processing to user interaction to computer graphics. Numerous domain specific, declarative languages for visualization definition exist. Such languages allow users to specify what they want to see as a graphical representation of their data, instead of specifying how that view should be generated. Languages such as The Grammar of Graphics or VEGA allow a user to describe the desired visualization in terms of its output mapping. However, visualizations are graphical representations of data, and they are often designed by visual designers, whose mental model does not fit well with the declarative programming style approach of developers. Visual designers tend to specify what they want to see as pixels using drawing tools, not as objects using programming tools. This means that any graphical representation of data has to be manually converted into a program (declarative or not) which is tedious and time consuming. Some solutions mostly focus on annotating existing visualizations with text.

For example, a system may have a receiving component that can receive data and a rendering component that can read a visualization descriptor from the data. The data comprises declarative specifications of a visualization and conforms to an extensible declarative language or model. It does not disclose how such data is created. The data typically includes a set of source descriptors, each of which can declaratively describe a respective data source, a set of transformation descriptors, each of which can declaratively describe a respective operation to be applied to the respective data source in order to yield a transformed result and a set of visualization descriptors, each of which can declaratively describe a respective visual representation. The rendering component composes an associated visual representation of the transformed result in visualization canvas.

Embodiments of the disclosed provide a method of generating a computer executable chart visualization from a static image of said chart visualization, the method comprising the steps of: providing said static image of said chart visualization; providing a set of pre-defined chart elements; identifying one or more portions of said static image as corresponding to one or more respective pre-defined chart elements; determining a mapping between said one or more portions of the static image and said one or more respective pre-defined chart elements; determining visual or logical properties of each of said one or more portions of said static image; and generating a declarative description of the chart visualization by setting the visual properties for each of said one or more respective pre-defined chart elements. These embodiments provide the advantage of generating a chart visualization having visual or logical properties corresponding to the static image.

In a preferred embodiment, the method further comprises the step, before said step of identifying, of, identifying one or more portions of said static image as corresponding to one or more respective pre-defined chart elements using image recognition to locate one or more visual borders of said one or more pre-defined chart elements within the static image; and wherein said step of identifying comprises providing input as to the accuracy and completeness of the identification of the one or more pre-determined chart elements corresponding to the one or more respective portions of the static image. The preferred embodiment has the advantage of allowing the user to assist the computer executable method to improve the accuracy and completeness of the recognition of chart elements.

In an embodiment, the method further comprises the step of rendering the declarative description to create an interactive visualization corresponding in appearance to the static image.

In an embodiment, said location of the visual borders of pre-defined chart elements within the static image comprises: transforming the static image into abstract shapes using known image recognition techniques; and comparing the assembly of abstract shapes against a number of known pre-defined chart elements and selecting the best matching chart element.

Embodiments of the disclosed also provide a system for generating a computer executable chart visualization from a static image of said chart visualization, the system comprising: a set of pre-defined chart elements; means for receiving input, identifying one or more portions of said static image as corresponding to one or more respective pre-defined chart elements; a mapping module, the mapping module determining a mapping between said one or more portions of the static image and said one or more respective pre-defined chart elements; a properties determination module, the properties determination module determining visual or logical properties of each of said one or more portions of the static image; and a declarative description generating module, the declarative description generating module generating a declarative description of the chart visualization by setting the visual or logical properties for each of the one or more respective pre-defined chart elements.

Embodiments of the disclosed also provide a computer program product for generating a computer executable chart visualization from a static image of said chart visualization, the computer program product comprising: a computer readable storage medium having computer readable program code embodied therewith, the computer readable program code adapted to perform the method described above when said program is run on a computer.

FIG. 1 shows an example chart image 100 that may be used as input to embodiments of the present disclosure. Example chart image 100 shows chart elements such as axes, gridlines, bars, and text, but these chart elements are not represented individually in the example chart image 100, but rather are merely included in the chart image 100. The example chart image 100 of FIG. 1 merely shows a simple chart with a minimal number of chart elements, but other exemplary chart images may include many other chart elements such as titles, subtitles, legend, x-axis titles and labels, y-axis titles and labels, and chart notes comprising text and/or graphics as well as buttons to select options or sliders to select one of a plurality of chart images. The exemplary chart image 100 of FIG. 1 is a bar chart, but other exemplary chart images may be of other types of chart, such as stacked bar, 100% stacked bar, line, area pie, Hi/Low/Close/Open, XY (Scatter), radar, mixed, number grid and doughnut, and many others. Such chart types may have many variations within the chart type, such as a bar chart having horizontal bars, vertical bars, the vertical or horizontal bars having the appearance of depth or bars located on a 2D grid and displayed in, for example, isometric format. The example chart image 100 is an image in, for example bitmap, jpeg, png, tiff, gif or other graphic format. The image may include animation of a plurality of chart images or of a plurality of images within the chart or other similar dynamic elements. However, it does not include the individual chart elements as separate entities; it merely includes them as portions of the static images.

Figure 2:
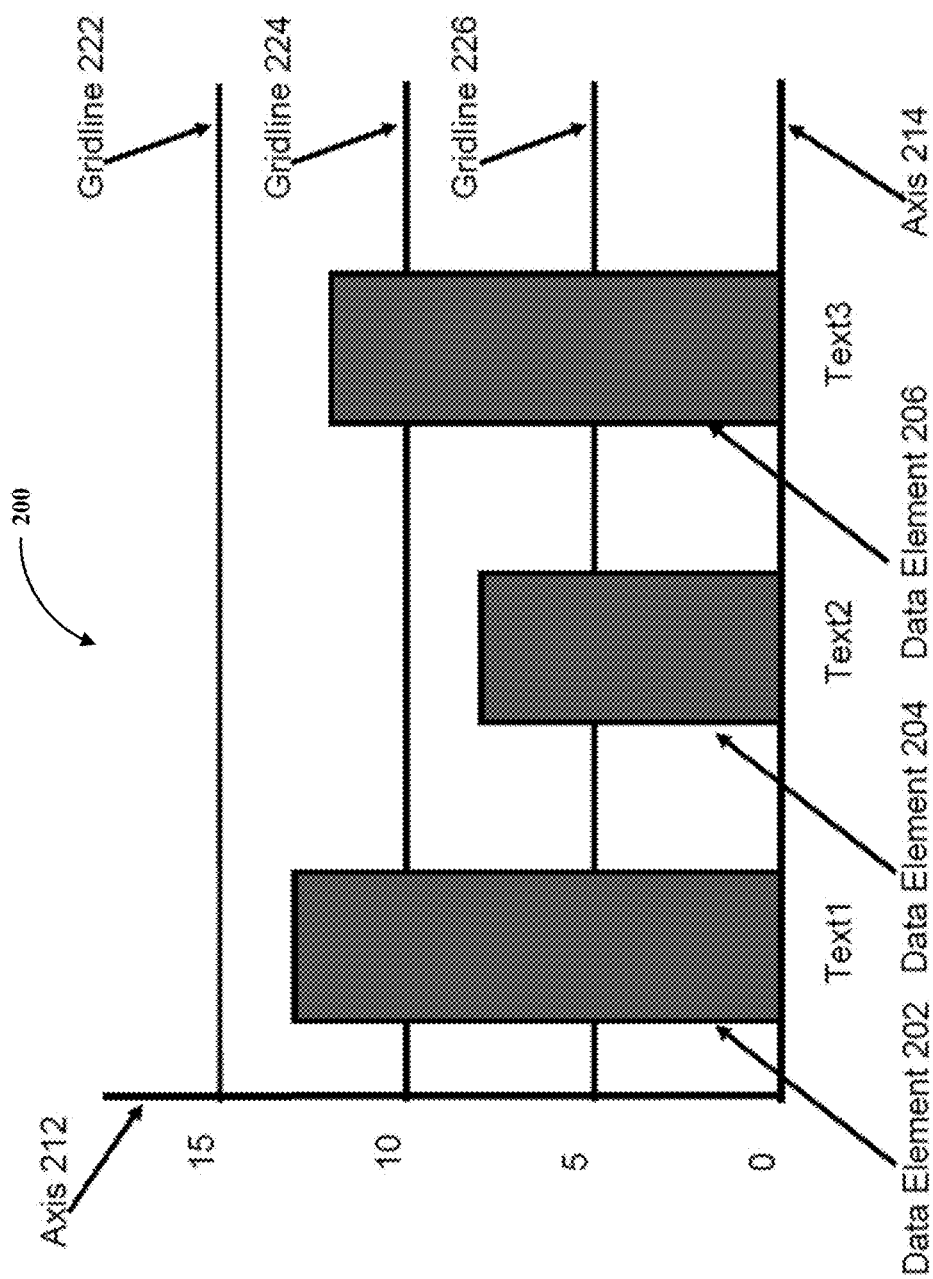
FIG. 2 shows the input image of FIG. 1 marked up to identify specified chart elements of the input image.

FIG. 2 shows the example chart image 100 of FIG. 1 annotated to produce the example chart image 200 of FIG. 2. In the example chart image of FIG. 2, the chart elements of axes 212, 214, visual data elements 202-206 and gridlines 222-226 have been annotated. Axes 212, 214 may be numerical or categorical. In the example of FIG. 2 axis 212 is a numerical axis and axis 214 is a categorical axis. Elements 202 comprises the bar of the chart and the associated text "Text1". Similarly elements 204 and 206 comprise their corresponding bars and text. In another embodiment, the bar and text may each be annotated as separate elements or sub-elements. Gridlines 222-226 are lines perpendicular to an axis which are usually aligned with a label on the axis.

Figure 3:
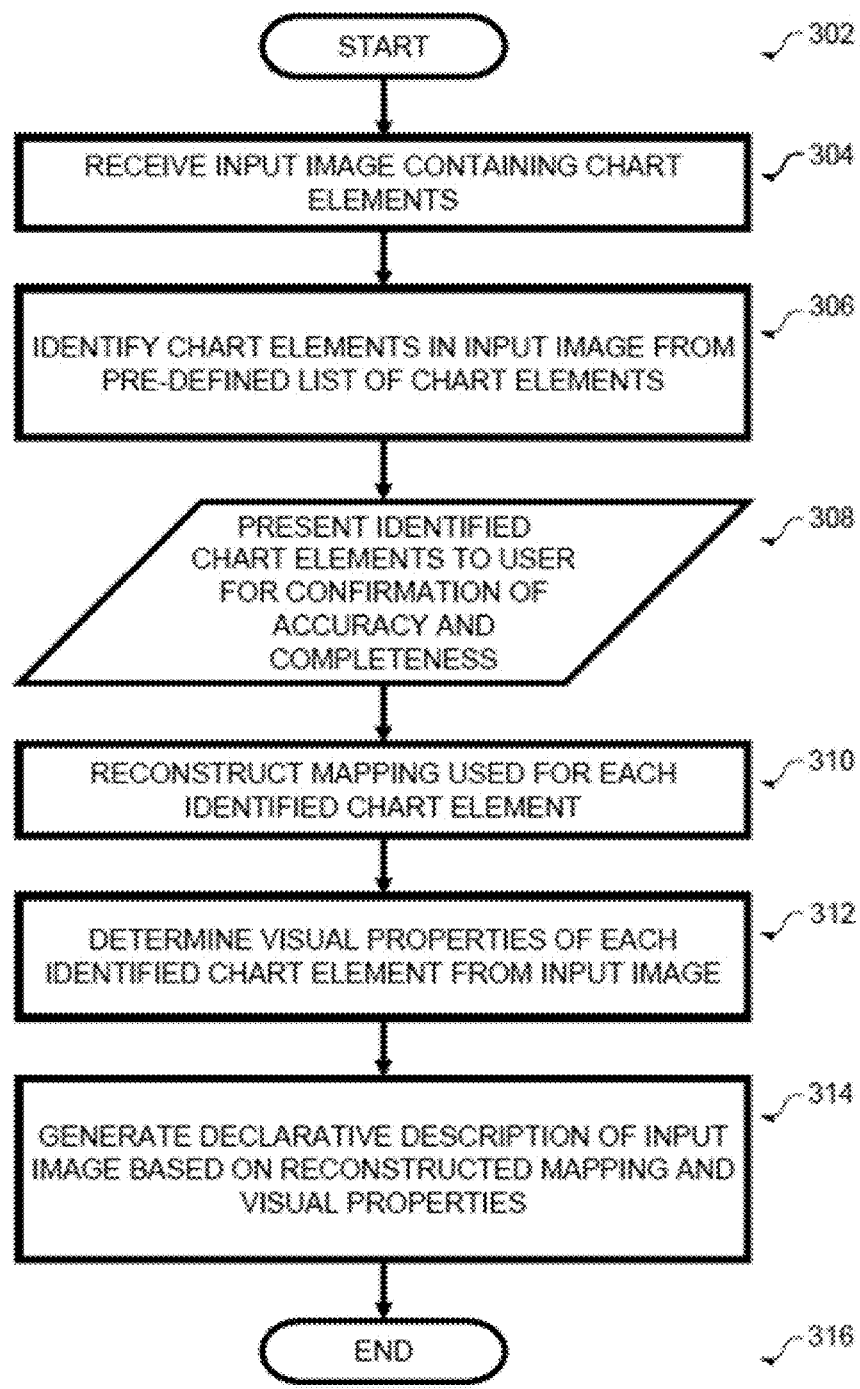
FIG. 3 shows a flow chart of an embodiment of a method of generating a computer executable chart visualization by annotating a static image of said chart according to the present disclosure.

FIG. 3 shows a flow chart of an embodiment of a method of generating a computer executable visualization by annotating a static image of said visualization according to the present disclosure. The embodiment starts at step 302. At step 304, an input image such as that of FIG. 1 showing the chart elements is received. The input image may be an image file generated by a computer program, or it may be a scanned image of a hardcopy chart or any other input image showing chart elements. Such an image may be created by a visual designer. The image may be a raster image, a vector image or a richer image format that captures the individual shapes in the picture, such as, for example, Adobe Illustrator .ai format.

At step 306, the chart elements in the input image are identified using a pre-defined list of chart elements. This identification is carried out using image recognition techniques which are well known to a person skilled in the art. In the example of FIG. 1, axes may be recognized scanning the input chart image 100 for horizontal or vertical lines, typically with numbers or text next to the axis at regular intervals. Referring briefly to FIG. 2, the y axis 212 may be recognized as having the numbers "0", "5", "10" and "15" next to the axis at regular intervals. An axis represents a mapping from a dimension in the data to a position in the input image. A numerical axis 212 maps a numerical range, for example, 0 to 15, to a range of pixels in the input chart image. The x axis 214 may be recognized as having the text "Text1", "Text2" and "Text3" next to the axis at regular intervals. A categorical axis 214 maps a series of discrete items, such as, for example Text1, Text2, Text3 to positions in the input image, where each discrete item is assigned a position along the categorical axis 214.

In the example of FIG. 1, visual data elements may be recognized as a repeating shape in the displayed input chart image 100 that is bordered by axes 212, 214. Referring briefly to FIG. 2, elements 202-206 typically represents a data point in a dataset. Each data point in the dataset consists of a number of values (text or numeric), one for each of the dimensions in the data. In FIG. 2, the data item "Text1" is associated with the numeric value 13, the data item "Text2" is associated with the numeric value 8 and the data item "Text1" is associated with the numeric value 12.

In the example of FIG. 1, gridlines may be recognized as lines perpendicular to an axis 212, 214 which are usually aligned with a label on the axis 212, 214. Referring briefly to FIG. 2, gridlines 222-226 are shown perpendicular to the y axis 212, aligned with each of the y axis labels "5", "10" and "15".

At step 308, the identified chart elements are presented to a user for confirmation of their accuracy and completeness. Alternatively, confirmation of their (the identified chart elements) accuracy and completeness can be carried out by a cognitive machine learning system. If some or all of the chart elements have not been correctly identified at step 306, the user or the system can apply one or more annotations to correct or augment the identification of these items by annotating the inaccurate or missing charts elements such as axes, elements or gridlines. Typically, the user or the system selects an annotation element from a menu of options and indicates where in the image this element in present. Embodiments of the disclosed assist the user or the system by using image recognition algorithms to help define the visual border of each element and by automatically setting visual properties for each annotation element used, such as color, line color, line width, font size, label format, and the like.

Embodiments of the disclosed assist the user by detecting edges of features present in the visualization, such that the assignment does not have to be exact. The markup used matches the base elements that are used in the declarative language description. Current implementations of declarative languages include concepts such as visual element, axis, legend and the like although more may be identified. Some elements may be clearly related to a visual in the original image (such as a slider) while other might be more abstract and related to the visualization logic (such as a mapping). Properties for each of these elements (such as color, spacing, or linewidth) are assigned automatically where possible, by having the system analyze the image. Color, Linecolor, Linewidth and FontSize, for example, can be easily read from the image and assigned to the appropriate markup element.

In an embodiment, location of the visual borders of pre-defined chart elements within the static image comprises transforming the static image into abstract shapes using known image recognition techniques and comparing the assembly of abstract shapes against a number of known pre-defined chart elements and selecting the best matching chart element.

At step 310, the mapping used when the input image 100 (from FIG. 1) was created is reconstructed for each of the chart elements. In the example of FIG. 2 above, the identified chart elements were two axes 212, 214, three gridlines 222-226, and three visual data elements 202-206.

For the axes 212, 214, the mapping is reconstructed by examining the labels found adjacent to the axes. If the labels are numeric, such as those adjacent to axis 212, then the axis is assumed to be a numeric axis. For a numeric axis, the physical distance in the input image between each of the labels is determined as is the numerical difference between each of the adjacent labels. If the physical distance and the numerical difference are in a linear relationship, then the numerical axis is a linear axis. If it is not, then the axis may be logarithmic or another function. The appropriate determination can be carried out to arrive at the function used, for example, if a logarithm of each of the numerical differences is in a linear relationship to the physical distance, then the axis is logarithmic. Other characteristics of the axes may also be determined, such as whether they represent currency, and if so, which currency, whether they are represented in scientific or percent format or whether they represent dates or times. Additionally, the number of decimal places may be determined if relevant, and the presence or absence of ticks along the axis at a major spacing of, for example 10 units, or of ticks at a minor spacing of, for example, 1 unit. These and other characteristics are exemplary only and the person skilled in the art will be able to implement appropriate determinations of these and other characteristics of each of the axes.

If the labels are categories, such as those adjacent to axis 214, then the axis is assumed to be a categorical axis. Reconstructing the mapping will include determining the physical spacing in the input image between each of the categories.

For the gridlines 222-226, the spacing of the gridlines is determined. In the same or a similar manner as described above for the axes, a determination may be done as to whether the grid lines shown are in a linear relationship or in a logarithmic relationship. The presence or absence of gridlines along the axis at a major spacing of, for example 10 units, or of gridlines at a minor spacing of, for example, 1 unit may be determined. These and other characteristics are exemplary only and the person skilled in the art will be able to implement appropriate determinations of these and other characteristics of each of the axes.

For the elements 202-206, each of the elements 202-206 is examined to determine differences between individual elements 202-206. Such differences indicate the aspect of the element 202-206 that is being determined by the data itself. For example, in FIG. 2, element 202 has a width of 4 units and a height of 13 units, element 204 has a width of 4 units and a height of 9 units and element 206 has a width of 4 units and a height of 12 units. This indicates that the height of the element 202-206 (or the position of the top of the element 202-206) is the aspect of the element 202-206 that is being determined by the data itself and that the data associated with the three elements 202-206 is [Text1,13], [Text2,8] and [Text3,12] respectively. Each of the elements 202-206 may also be examined for other characteristics that may be determined by the data itself, such as whether the size varies between elements 202-206 or the color varies between elements 202-206. If there is an unused axis available, then an attempt is made to match the characteristic which varies between data elements to the unused axis. If there is not an unused axis available, then the variation between elements is being determined by a yet unknown data dimension, which is added to the declarative description.

At step 312, the visual properties of each of the identified chart elements such as axes 212, 214, gridlines 222-226 and elements 202-206 are determined. The visual properties of each chart element may include the font being used for the axis labels (Arial in the example of FIG. 2), the size of the font (12.8 in the example of FIG. 2) the color of the gridlines (50% gray in the example of FIG. 2), the color of the elements (70% gray in the example of FIG. 2), and many other aspects such as line thickness, line style, pattern type, pattern color, presence or absence of a shadow. The skilled person will be aware that there are many other visual properties such as text color, bold, italic and the like.

At step 314, a declarative description of the input image is generated based on the reconstructed mapping determined at step 310 and the visual properties determined at step 312. An exemplary description of the mapping in declarative format is given below.

```
{
data :          { fields : [{ id : A, id : B }],
                    items : [ [Text1,13], [Text2,8], [Text3,12] ], },
coordinates :   { axis : { id : x, field : A },
    axis : { id : y, field : B, type : linear },
    gridline : {color : 50% gray},
    background : {fill : white}, },
elements :      { type : rectangle},
                    position : { left : x(A), top : y(B), bottom : y(0),
                    width : 40px},
                    style : { fill : {r : 127, g : 127, b : 127} }
}
```

The first item above is the data having two fields with identifiers of A and B. A first data item has identifier A being "Text1" and identifier B being a numeric value of 13. A second data item has identifier A being "Text2" and identifier B being a numeric value of 8. A third data item has identifier A being "Text3" and identifier B being a numeric value of 12.

The second item above represents the coordinate system. This comprises two axes, the first having an identifier of "x" and the second having an identifier of "y". The first axis is associated with the field having an identifier of A mentioned above and the second axis is associated with the field having an identifier of B mentioned above. The coordinate system further comprises gridlines associated only with the axis having an identifier of "y", having a color of 50% gray. The axis having an identifier of "x" does not have gridlines associated with it. The background to the coordinate system is filled with the color white.

The third item represents the visual data elements. These have a type of rectangle and are positioned such that their left side is located along the x axis at a position determined by the field having an identifier of A, their top side is positioned along the y axis at a position determined by the field having an identifier of B and their bottom side is located along the y axis at position 0. The width of the rectangles is given as 40 pixels, corresponding to the 4 units width of the elements in FIG. 2 described above. The elements have a style attribute, which indicates that they are filled with a color having red, green and blue values of 127, corresponding to the 50% gray described above. Typically, the fill will not be black or gray, but will be a color, such as a light blue having red, green and blue values of 20, 30, and 190 respectively.

Figure 4:
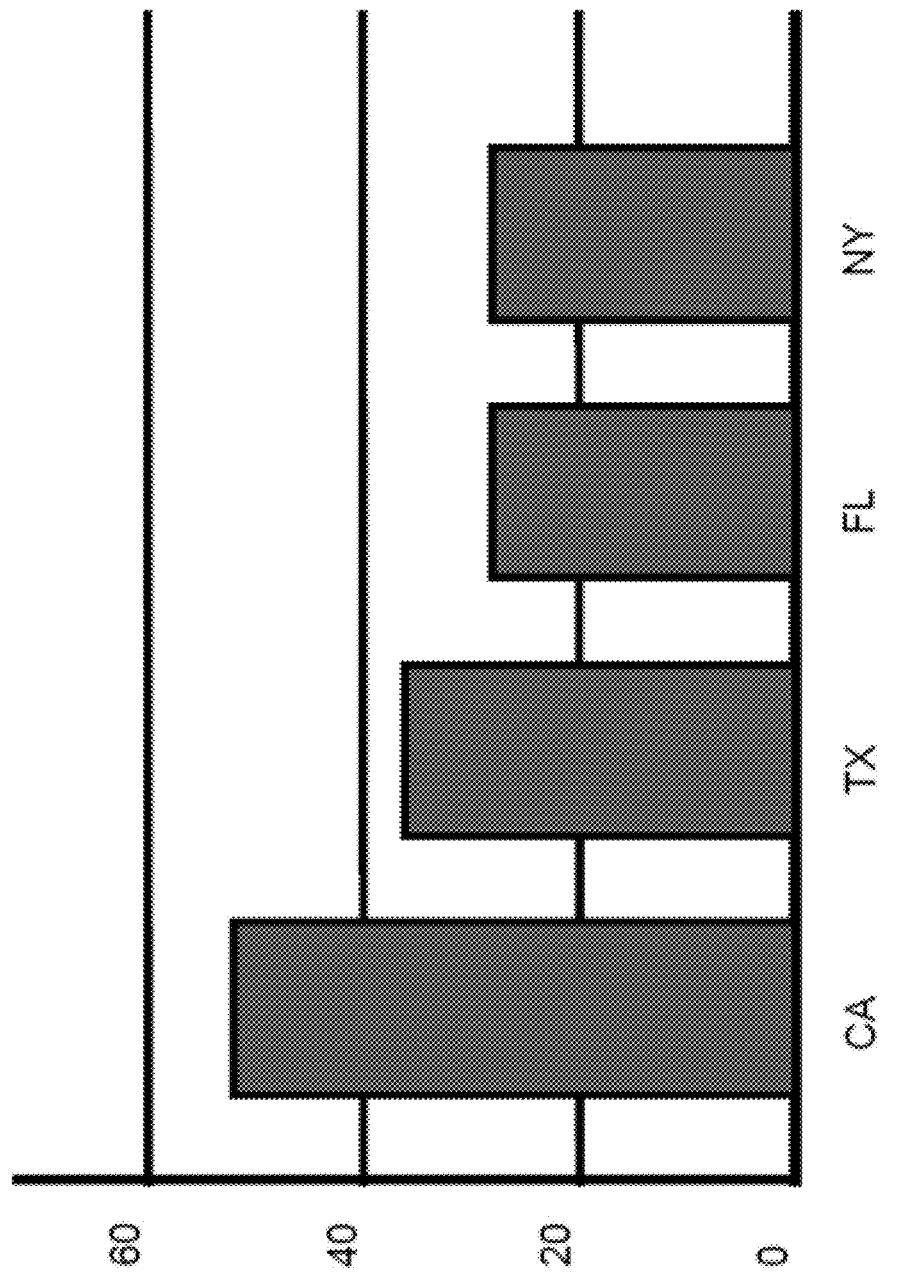
FIG. 4 shows a chart generated from the computer executable visualization of the chart image of FIG. 1 using different data.

The above declarative description may be used to regenerate the input image in chart form using an existing graphics engine to render the chart virtualization with graphic data. The chart can be regenerated with different data or an interactive version of the chart may be created. FIG. 4 shows an example of a chart created using a method according to an embodiment of the present disclosure being applied to the input image of FIG. 1. The chart characteristics are the same as those of FIG. 1, but instead of three data points, there are four and the data values are [CA,53], [TX,36], FL,27] and [NY,27]. These data values correspond to the abbreviations used for US states and the number of house seats for the respective states. An exemplary declarative description for the chart of FIG. 4 is shown below. As can be seen, the difference between this description and that determined for the input image of FIG. 1 is solely that the items reflect the different data points of FIG. 4 when compared to FIG. 1.

```
{
data :          { fields : [{ id : A, id : B }],
                    items : [ [CA,53], [TX,36], [FL,27], [NY,27] ], },
coordinates :   { axis : { id : x, field : A },
    axis : { id : y field : B },
    gridline : {color : 50% gray}, {type : linear }
    background : {fill : white}, },
elements :      { type : rectangle},
                    position : { left : x(A), top : y(B), bottom : y(0),
                    width : 40px},
                    style : { fill : {r : 127, g : 127, b : 127} }
}
```

The embodiment of the method of the present disclosure ends at step 316.

Figure 5:
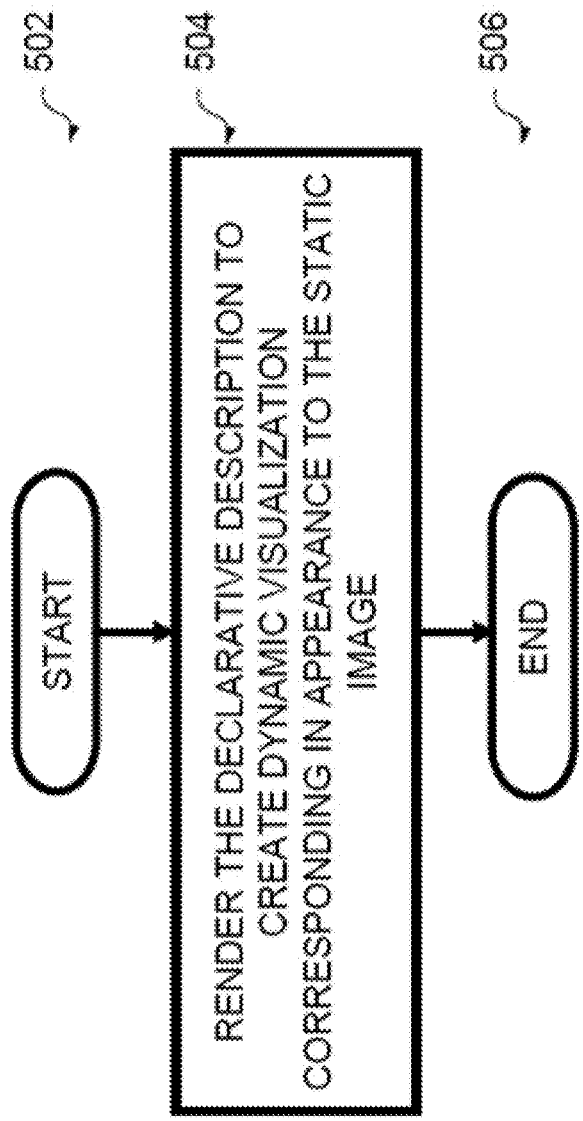
FIG. 5 shows a flow chart of an optional extension to the method of the flow chart of FIG. 4.

FIG. 5 shows an optional extension which may be implemented in other embodiments of the disclosed after step 314 of FIG. 3. The additional step starts at step 502. At step 504, the declarative description is rendered to create a dynamic visualization corresponding in appearance to the static image, but which is in an editable chart form. The additional step ends at step 506.

Figure 6:
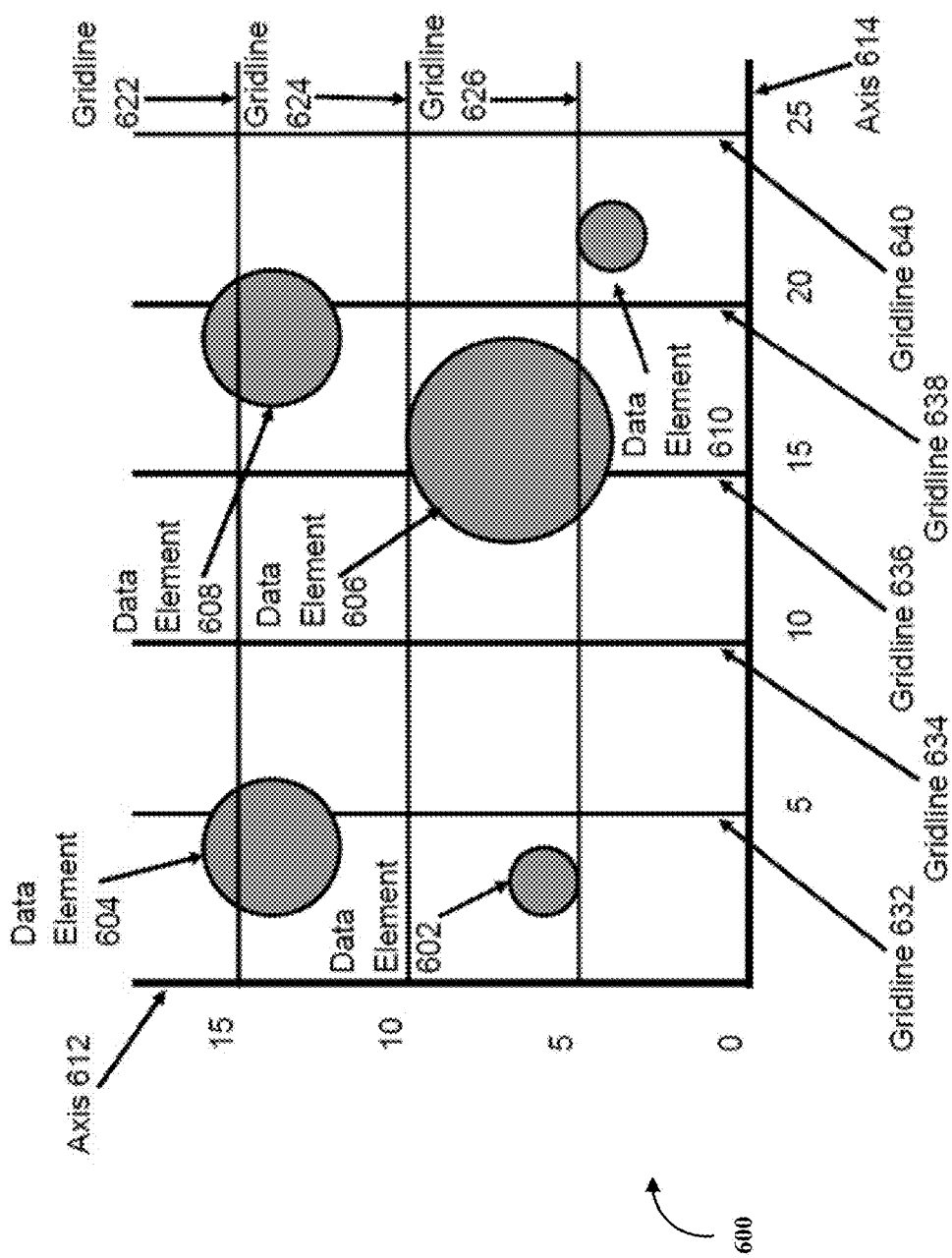
FIG. 6 shows another example chart image that may be used as input to embodiments of the present disclosure.

FIG. 6 shows another example chart image that may be used as input to embodiments of the present disclosure. In the example chart image of FIG. 6, the chart elements of axes 612, 614, elements 602-610 and gridlines 622-640 have been annotated. An exemplary description of the mapping in declarative format is given below.

```
{
data :      { fields : [ { id : A, id : B, id : C },
    items : [ [3,6, 1], [4,14, 2], [16,7, 3], [19,14, 2], [22, 4, 1] ] ] },
coordinates :   { axis : { id : x, field : A, gridline : {color : 50% gray},
        type : linear },
        axis : { id : y field : B, gridline : {color : 50% gray}, type :
        linear },
        background : {fill : white} },
elements :      { type : circle},
            position : { x : x(A), y : y(B), radius : C },
            style : { fill : {r : 102, g : 102, b : 102} }
}
```

The first item above is the data having three fields with identifiers of A, B and C. A first data item has identifier A having a numeric value of 3, identifier B having a numeric value of 6 and identifier C having a numeric value of 1. A second data item has identifier A having a numeric value of 4, identifier B having a numeric value of 14 and identifier C having a numeric value of 2. A third data item has identifier A having a numeric value of 16, identifier B having a numeric value of 7 and identifier C having a numeric value of 3. A fourth data item has identifier A having a numeric value of 19, identifier B having a numeric value of 14 and identifier C having a numeric value of 2. A fifth data item has identifier A having a numeric value of 22, identifier B having a numeric value of 4 and identifier C having a numeric value of 1.

The second item above represents the coordinate system. This comprises two axes 612, 614, the first 614 having an identifier of "x" and the second 612 having an identifier of "y", both being of type linear. The first axis 614 is associated with the field having an identifier of A mentioned above and the second axis 612 is associated with the field B mentioned above. The coordinate system further comprises gridlines 622-626 having a color of 50% gray. The gridlines 622-626 for each of the axes 612, 614 are shown separately. The background to the coordinate system is filled with the color white.

The third item is the elements 602-610. These have a type of circle and are positioned such that their center is located along the x axis 614 at a position determined by the field having an identifier of A and along the y axis 612 at a position determined by the field having an identifier of B. The radius of each of the circles is determined by the field having an identifier of C. The elements 602-610 have a style attribute, which indicates that they are filled with a color having red, green and blue values of 102, corresponding to 40% gray. Typically, the fill will not be black or gray, but will be a color, such as a light blue having red, green, and blue values of 20, 30, and 190 respectively.

Figure 7:
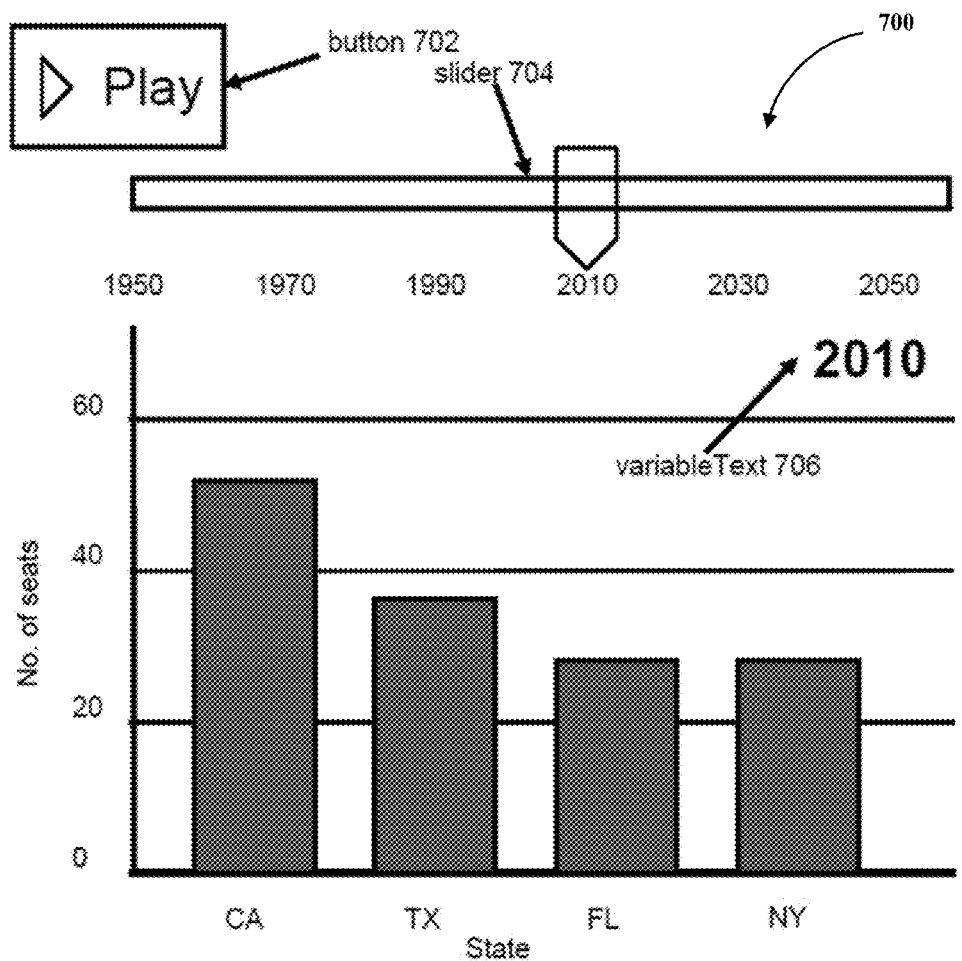
FIG. 7 shows another example chart image having additional chart elements that may be used as input to embodiments of the present disclosure.

FIG. 7 shows another example chart image 700 having additional chart elements 702, 704, 706 that may be used in an input image for embodiments of the present disclosure. Button 702 is used to play an animation of, for example, six different versions of the chart having different data. Slider 704 may be used to indicate which year's data is being shown on the chart when button 702 has been used to play an animation of the six different versions or slider 704 may be used to directly control which year's data is shown in the chart. Both functions of the slider may optionally be combined. Other variations of the slider will be familiar to persons skilled in the art. VariableText 706 may be used to indicate which year's data is currently being displayed on the chart. VariableText 706 may be used in many other ways which will be familiar to persons skilled in the art. Each of these elements 702-706 and many others may be determined from the input image using conventional image processing techniques.

Figure 8:
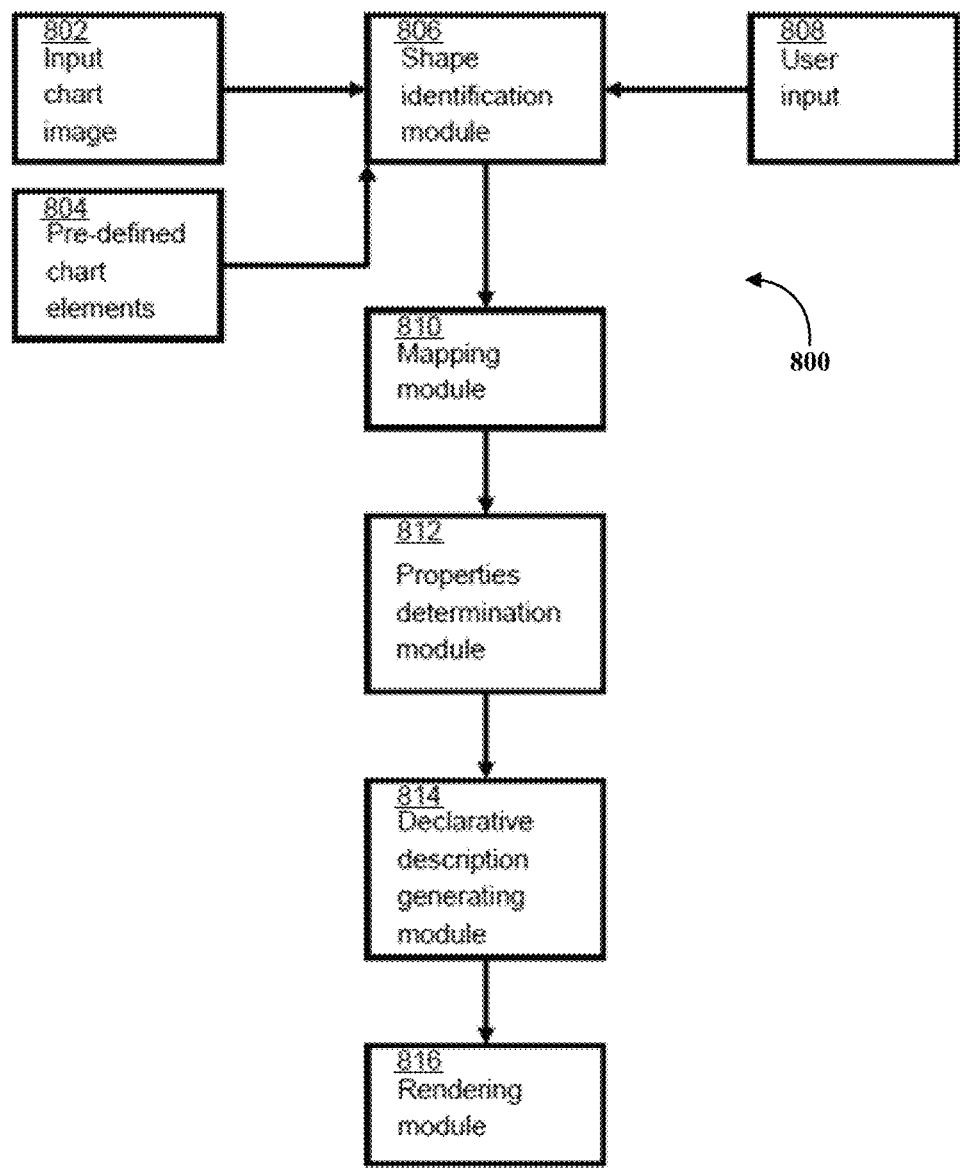
FIG. 8 shows an embodiment of a system according to the present disclosure.

FIG. 8 shows an embodiment of a system 800 according to the present disclosure for generating a computer executable chart visualization from a static image 802 of said chart visualization. The system comprises a set of pre-defined chart elements 804 as described above and typically including axes 212, 214, elements 202-206, gridlines 222-226 and text. User input 808 is received identifying one or more portions of said static image as corresponding to one or more respective pre-defined chart elements 804. A mapping module 810 determines a mapping between said one or more portions of the static image 802 and said one or more respective pre-defined chart elements 804. A properties determination module 812 determines properties of each of said one or more portions of the static image 802. A declarative description generating module 814 generates a declarative description of the chart visualization by setting the visual properties for each of the one or more respective pre-defined chart elements 804.

An embodiment of the system further comprises a shape identification module 806 which identifies one or more portions of said static image 802 as corresponding to one or more respective pre-defined chart elements 804 using image recognition to locate one or more visual borders of said one or more pre-defined chart elements 804 within the static image 802. The user input 808 provides information as to the accuracy and completeness of the identification of the one or more pre-determined chart elements 804 corresponding to the one or more respective portions of the static image 802.

An embodiment of the system further comprises a rendering module 816 which renders the declarative description to create a visualization corresponding in appearance to the static image 802.

In an embodiment, the shape identification module 806 transforms the static image 802 into abstract shapes using known image recognition techniques and compares the assembly of abstract shapes against a number of known pre-defined chart elements 804 and selects the best matching chart element 804.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, column-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosed. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method of generating a computer executable chart visualization from a static image of said chart visualization, the method comprising the steps of:
   identifying said static image of said chart visualization;
   identifying a set of pre-defined chart elements;
   identifying one or more portions of said static image as corresponding to one or more respective pre-defined chart elements, wherein the identifying one or more portions comprises:
     using image recognition to locate one or more visual borders of said one or more pre-defined chart elements within the static image; and
     receiving, from a user, input regarding accuracy and completeness of the one or more visual borders of said one or more pre-defined chart elements within the static image, wherein input regarding completeness includes one or more annotations regarding missing chart elements;
   determining a mapping between said one or more portions of the static image and said one or more respective pre-defined chart elements;
   determining visual properties of each of said one or more portions of said static image; and
   generating a declarative description of the chart visualization by setting the visual properties for each of said one or more respective pre-defined chart elements.

2. The method of claim 1, further comprising rendering the declarative description to create an interactive visualization corresponding in appearance to the static image, wherein the interactive visualization includes a dynamic visualization of an editable chart generated from the declarative description and rendered with graphic data.

3. The method of claim 1, wherein said using image recognition to locate one or more visual borders of pre-defined chart elements within the static image comprises:
   transforming the static image into abstract shapes using known image recognition techniques; and
   comparing an assembly of the abstract shapes against a number of known pre-defined chart elements and selecting a best matching chart element.

4. The method of claim 1, wherein said pre-defined chart elements include axes, elements, gridlines, and text.

5. The method of claim 1, wherein the declarative description is directly translated into computer executable code.

6. The method of claim 1, wherein visual properties include color, line color, line width, font size, and label format.

7. The method of claim 1, wherein input regarding accuracy and completeness of the one or more visual borders of said one or more pre-defined chart elements within the static image is received from a cognitive machine learning system.

8. The method of claim 1, wherein the static image includes portions corresponding to dynamic elements.

9. A system for generating a computer executable chart visualization from a static image of said chart visualization, the system comprising:

a computer readable medium with program instructions stored thereon; and one or more processors configured to execute the program instructions to perform the method comprising:

identifying said static image of said chart visualization;

identifying a set of pre-defined chart elements;

identifying one or more portions of said static image as corresponding to one or more respective pre-defined chart elements, wherein the identifying one or more portions comprises:

using image recognition to locate one or more visual borders of said one or more pre-defined chart elements within the static image; and receiving, from a user, input regarding accuracy and completeness of the one or more visual borders of said one or more pre-defined chart elements within the static image, wherein input regarding completeness includes one or more annotations regarding missing chart elements;

determining a mapping between said one or more portions of the static image and said one or more respective pre-defined chart elements;

determining visual properties of each of said one or more portions of said static image; and generating a declarative description of the chart visualization by setting the visual properties for each of said one or more respective pre-defined chart elements.

10. The system of claim 9, wherein the method further comprises rendering the declarative description to create an interactive visualization corresponding in appearance to the static image, wherein the interactive visualization includes a dynamic visualization of an editable chart generated from the declarative description and rendered with graphic data.

11. The system of claim 9, wherein said using image recognition to locate one or more visual borders of pre-defined chart elements within the static image comprises:

transforming the static image into abstract shapes using known image recognition techniques; and comparing an assembly of the abstract shapes against a number of known pre-defined chart elements and selecting a best matching chart element.

12. The system of claim 9, wherein said pre-defined chart elements include axes, elements, gridlines, and text.

13. The system of claim 9, wherein the declarative description is directly translated into computer executable code.

14. The system of claim 9, wherein visual properties include color, line color, line width, font size, and label format.

15. A computer program product for generating a computer executable chart visualization from a static image of said chart visualization, the computer program product comprising a computer readable storage medium having program instructions embodied therewith, wherein the computer readable storage medium is not a transitory signal per se, the program instructions executable by a processor to cause a device to perform the method comprising:

identifying said static image of said chart visualization;

identifying a set of pre-defined chart elements;

identifying one or more portions of said static image as corresponding to one or more respective pre-defined chart elements, wherein the identifying one or more portions comprises:

using image recognition to locate one or more visual borders of said one or more pre-defined chart elements within the static image; and receiving, from a user, input regarding accuracy and completeness of the one or more visual borders of said one or more pre-defined chart elements within the static image, wherein input regarding completeness includes one or more annotations regarding missing chart elements;

determining a mapping between said one or more portions of the static image and said one or more respective pre-defined chart elements;

determining visual properties of each of said one or more portions of said static image; and generating a declarative description of the chart visualization by setting the visual properties for each of said one or more respective pre-defined chart elements.

16. The computer program product of claim 15, wherein the method further comprises rendering the declarative description to create an interactive visualization corresponding in appearance to the static image, wherein the interactive visualization includes a dynamic visualization of an editable chart generated from the declarative description and rendered with graphic data.

17. The computer program product of claim 15, wherein said using image recognition to locate one or more visual borders of pre-defined chart elements within the static image comprises:

transforming the static image into abstract shapes using known image recognition techniques; and comparing an assembly of the abstract shapes against a number of known pre-defined chart elements and selecting a best matching chart element.

18. The computer program product of claim 15, wherein said pre-defined chart elements include axes, elements, gridlines, and text.

19. The computer program product of claim 15, wherein the declarative description is directly translated into computer executable code.

20. The computer program product of claim 15, wherein visual properties include color, line color, line width, font size, and label format.

* * * * *